United States Patent

Wells et al.

[11] Patent Number: 6,125,281
[45] Date of Patent: Sep. 26, 2000

[54] REAL-TIME SMS APPLICATION MESSAGING USING AN SMSC-LINKED SERVER

[75] Inventors: Mark Wells; Rolf Huber, both of Oulu, Finland

[73] Assignee: Nokia Mobile Phones Limited, Espoo, Finland

[21] Appl. No.: 08/811,550

[22] Filed: Mar. 4, 1997

Related U.S. Application Data

[60] Provisional application No. 60/036,770, Jan. 31, 1997.

[51] Int. Cl.[7] .................................................. H04Q 7/20
[52] U.S. Cl. ........................... 455/466; 455/414; 455/422
[58] Field of Search .................................. 455/31.1, 31.2, 455/31.3, 412, 414, 472, 466, 552, 553, 556, 557; 370/352, 389, 392

[56] References Cited

U.S. PATENT DOCUMENTS

| | | | |
|---|---|---|---|
| 5,577,103 | 11/1996 | Foti | 455/414 |
| 5,635,918 | 6/1997 | Tett | 455/466 |
| 5,818,833 | 10/1998 | Maruyama | 455/553 |

FOREIGN PATENT DOCUMENTS

| | | |
|---|---|---|
| 0 642 283 A2 | 3/1995 | European Pat. Off. . |
| 0 689 368 A1 | 12/1995 | European Pat. Off. . |
| 0 748 135 A2 | 12/1996 | European Pat. Off. . |
| 0 822 728 A2 | 7/1997 | European Pat. Off. . |
| WO 92/14329 | 8/1992 | WIPO . |
| WO 95/12933 | 5/1995 | WIPO . |
| WO 97/20442 | 6/1997 | WIPO . |

*Primary Examiner*—Dwayne D. Bost
*Assistant Examiner*—Nay Maung
*Attorney, Agent, or Firm*—Ohlandt, Greeley, Ruggiero & Perle

[57] ABSTRACT

A method is disclosed for operating a wireless mobile station of a type that is capable of bidirectional communication with a BMI having a SMS center. The method includes the steps of: (a) receiving a SMS message from the BMI; (b) determining if the SMS message has a first transfer format or a second transfer format; (c) if the SMS message is determined to have the first transfer format, processing the SMS message in a conventional manner; (d) if the SMS message is determined to have the second transfer format, parsing the SMS message to locate an Application Identifier entry; (e) determining from the Application Identifier entry if the mobile station supports the identified application; (f) if not, displaying a data entry of the SMS message with a first display format; else, (g) if the mobile station does support the identified application, starting the application and displaying the data entry with a second display format specified by the application. In a presently preferred embodiment of this invention the second format is a Data Exchange, Storage, and Command (DESC) format, and an application specified by the DESC formatted SMS message can be a Personal Messaging Calendar (PMC) application. Access to the PMC application can be via SMS messages from the mobile station, or through a network-connected data processor, such as a PC connected to the internet.

31 Claims, 4 Drawing Sheets

REAL-TIME SMS APPLICATION MESSAGING USING AN SMSC-LINKED SERVER

CLAIM OF PRIORITY FROM A COPENDING PROVISIONAL APPLICATION

This patent application claims priority under 35 U.S.C. §1.119(e) from copending Provisional Patent Application No. 60/036,770, filed Jan. 31, 1997 with Express Mail Certificate No.: EM 029 037 951 U.S., entitled "REAL-TIME SMS APPLICATION MESSAGING USING AN SMSC-LINKED SERVER" by M. Wells and R. Huber, the disclosure of which is incorporated by reference herein in its entirety.

FIELD OF THE INVENTION

This invention relates generally to wireless communicators and, in particular, to mobile stations such as those capable of operation with a cellular network.

BACKGROUND OF THE INVENTION

The Short Message Service (SMS) is a teleservice which enables a user to send messages to and receive text messages from other users of a communications (cellular) network. The SMS function attempts to deliver a message to a mobile station whenever the mobile station is registered to the network, even when the terminal is engaged in a voice or data call. The mobile station may also roam throughout the network and still be capable of sending and receiving messages. A mobile station configured for SMS provides methods for the user to receive, read, write/edit, clear, send, and save messages.

The network stores messages in at least one SMS Center (SMSC), and Mobile Terminated (MT) messages are sent to the terminal from the SMSC. Various SMS protocol layers receive the messages and check their contents. If the contents are valid, and assuming that there is room for incoming text messages in the memory of the mobile station, the message is received and stored. Otherwise, the message is rejected.

Reference can be had to the TIA Interim Standards IS-136 and IS-137, and also to a document entitled "TDMA Forum, Implementation Guide: Short Message Terminals Compliant With IS-136 and IS-137" (Ed. D. Holmes, vers. 7.0, Apr. 20, 1995). These documents specify a type of SMS and the various system and terminal level protocols required to provide SMS in a cellular telecommunications system.

In current telecommunications systems SMS messages may be sent from an application resident in a mobile station, or from a PC application that is connected by a LAN to the internet. A SMSC (Short Message Service Center) receives the SMS message from the cellular network, or from an internet gateway, respectively. The SMSC then immediately directs the message to the mobile station, or after it has detected that the mobile station has locked onto a channel and entered an idle state.

A problem exists with this current approach, in that there may exist a set of PC applications that are designed to communicate with a user's own mobile station or other mobile stations. That is, applications currently exist or will exist that require a more deterministic delivery of information when using the internet.

A further problem relates to the running of real-time applications from easily disconnected PCs, such as laptops, that may be occasionally disconnected from the normal host network. Information may need to be exchanged in a timely manner in either direction between the mobile station and the PC, yet the PC may be disconnected or the network may be too slow in delivering the data. In this case those applications which need to deliver or receive data messages, regardless of connection state and other circumstances, will not perform correctly.

Furthermore, a number of different formats have been specified for encoding information to enable applications to communicate with one another. One application must be capable of interpreting information that has been generated and encoded by another application.

Unfortunately, the formats that have been specified thus far do not meet the high requirements imposed by a real-time SMS application messaging system. Typically the information is encoded in binary form which is not interpretable by humans, and/or the encoded information is too lengthy to be transmitted as a length-constrained SMS message, and/or the format is too specific to be used by a wide range of different applications.

Ideally, a flexible yet well defined generic format and message structure is needed which fulfills the following criteria.

First, the encoded information should be readable by a human (i.e., no binary encoding), should be easy for a user to enter, should be capable of being transmitted as a SMS message, should be as short as possible (preferably not exceeding the length of one SMS message), should consist only of characters which are supported by the SMS character set, and should be designed so that it can be stored without information conversion.

Second, the message format should provide a mechanism which enables the encoded information to be divided and reassembled (in case the information exceeds the length of one SMS message), should allow a capability to define commands, and should not restrict its usage to one or more specific applications so as to preclude its use with future applications. The message format should also be capable of holding one or more data values and should not restrict the order of data values, should allow parts of data values to be omitted, should provide an error handling capability, and should be sufficiently specified so that applications can represent any received encoded information in a user-friendly manner, even though a particular message was not intended for the user.

Also, most message formats are specified for "one-way" communication, meaning that information is sent from a sender to a receiver. They do not take into account possible responses, results of queries, or error handling on a high level.

OBJECTS OF THE INVENTION

It is thus a first object of this invention to provide an improved method for delivering messages in a telecommunications system.

It is another object of this invention to provide a telecommunications system having a wireless component, wherein SMS messages are used in the wireless component, and to enable applications to communicate through the system using SMS messages.

It is a further object of this invention to provide a generic message format which fulfills the requirements for a real-time SMS application messaging system.

SUMMARY OF THE INVENTION

The foregoing and other problems are overcome and the objects of the invention are realized by methods and apparatus in accordance with embodiments of this invention. A method of this invention is disclosed for operating a wireless mobile or user station to provide for real-time Short Message Service (SMS) Application Messaging, using an SMSC-linked server, for providing timely message delivery in non-deterministic networks and where device connections are intermittent or periodic.

By connecting the server directly to a SMSC, or by linking the server to the SMSC through a low latency network, applications can tolerate the latency and intermittence of the LAN-based PC link which is connected to a network, such as the internet or a private leased link. PC and mobile station-based applications are enabled to direct SMS messages to the server to achieve timely store-and-forward functionality.

Potential applications of this invention include, but are not limited to, using SMS-based messaging between groups of mobile stations and PCs for queued and scheduled email; for meeting, appointment and absence management; for obtaining reminders from organizer and calendar applications; for project hours reporting; for sales and inventory updating; for personalized information services; and for home security applications.

A method is disclosed for operating a wireless mobile station of a type that is capable of bidirectional communication with a Base Station, Mobile Switching Center, Interworking Function (BMI) having a user messaging function, such as a Short Message Service (SMS) function. The method includes the steps of: (a) providing a database that is bidirectionally coupled to the user messaging function; (b) at the mobile station, entering information that is descriptive of an event, typically a future event; (c) sending the entered information from the mobile station to the database, via a message sent through the BMI and the user messaging function; and (d) storing the information in the database.

Further in accordance with this invention a method is disclosed for operating a wireless mobile station of a type that is capable of bidirectional communication with a BMI having a SMS center. The method includes the steps of: (a) receiving a SMS message from the BMI; (b) determining if the SMS message has a first transfer format or a second transfer format; (c) if the SMS message is determined to have the first transfer format, processing the SMS message in a conventional manner; (d) if the SMS message is determined to have the second transfer format, parsing the SMS message to locate an Application Identifier entry; (e) determining from the Application Identifier entry if the mobile station supports the identified application; (f) if not, displaying a data entry of the SMS message with a first display format; else, (g) if the mobile station does support the identified application, starting the application and displaying the data entry with a second display format specified by the application. In a presently preferred embodiment of this invention the second transfer format is a Data Exchange, Storage, and Command (DESC) format.

In an exemplary, but not limiting, embodiment of this invention the SMS message is encoded to identify an event that was previously stored in a database that is coupled to the SMS center, and the SMS message is sent to the mobile station at a time specified in the database. In one embodiment the information specifying the event was previously stored in the database in response to a SMS message that was originated by the mobile station, while in another embodiment the information specifying the event was previously stored in the database in response to a message that was originated by a data processor coupled to the database through a network, such as the internet.

In the exemplary embodiment the SMS message can be encoded to identify a prioritized future event that was previously stored in the database, and the SMS message is sent to the mobile station in response to a query from the mobile station to display all stored future events having a specified priority level.

Also in the exemplary embodiment the SMS message can be sent in response to a query from the mobile station to display all stored future events having a specified future date.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
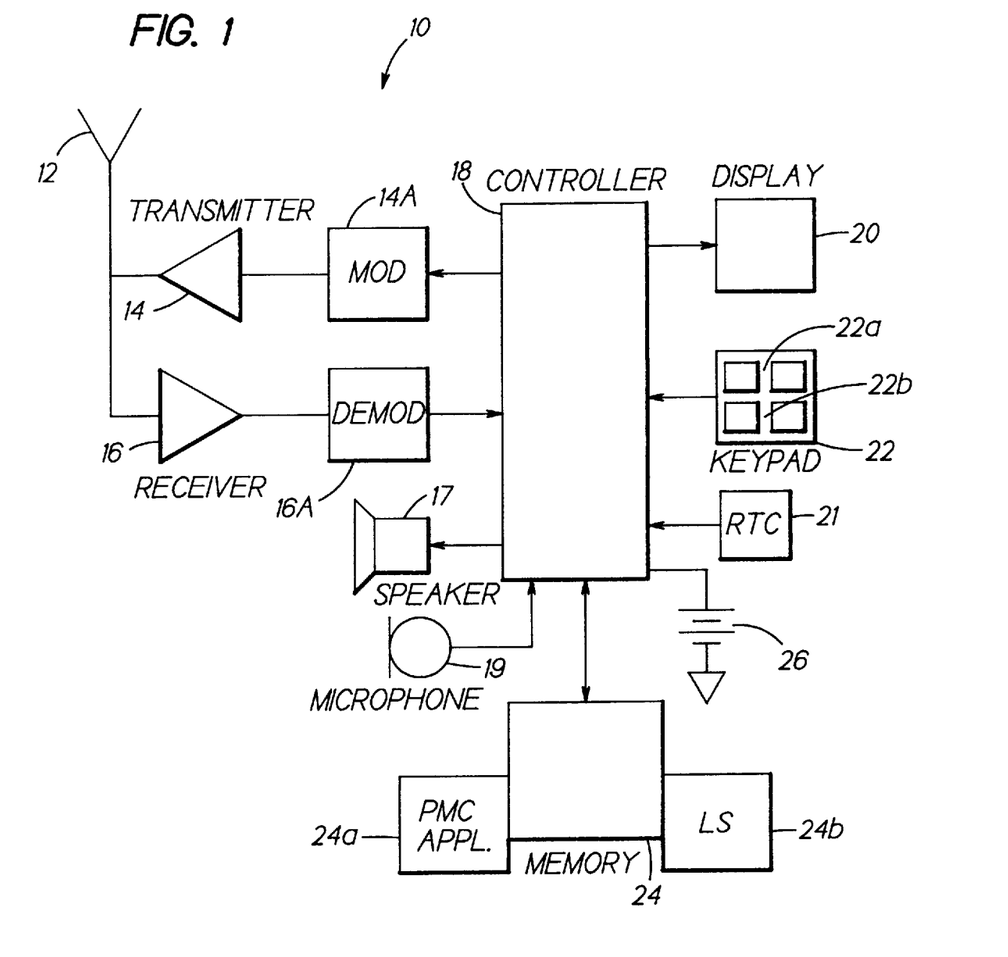
FIG. 1 is a block diagram of a mobile station that is suitable for use with this invention.
Figure 2:
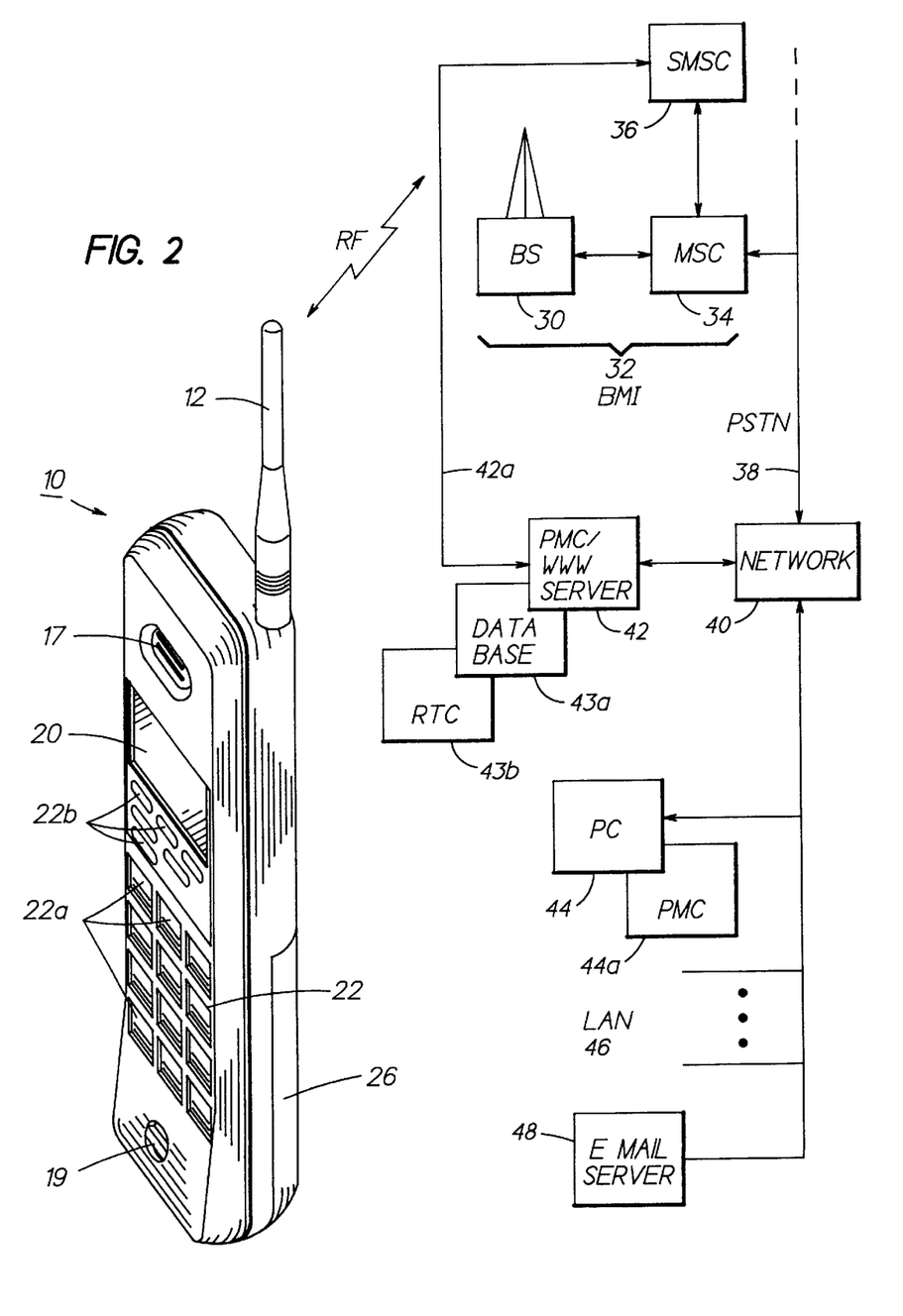
FIG. 2 is an elevational view of the mobile station shown in FIG. 1, and which further illustrates a first embodiment of a cellular communication system to which the mobile station is bidirectionally coupled through wireless RF links.
Figure 3:
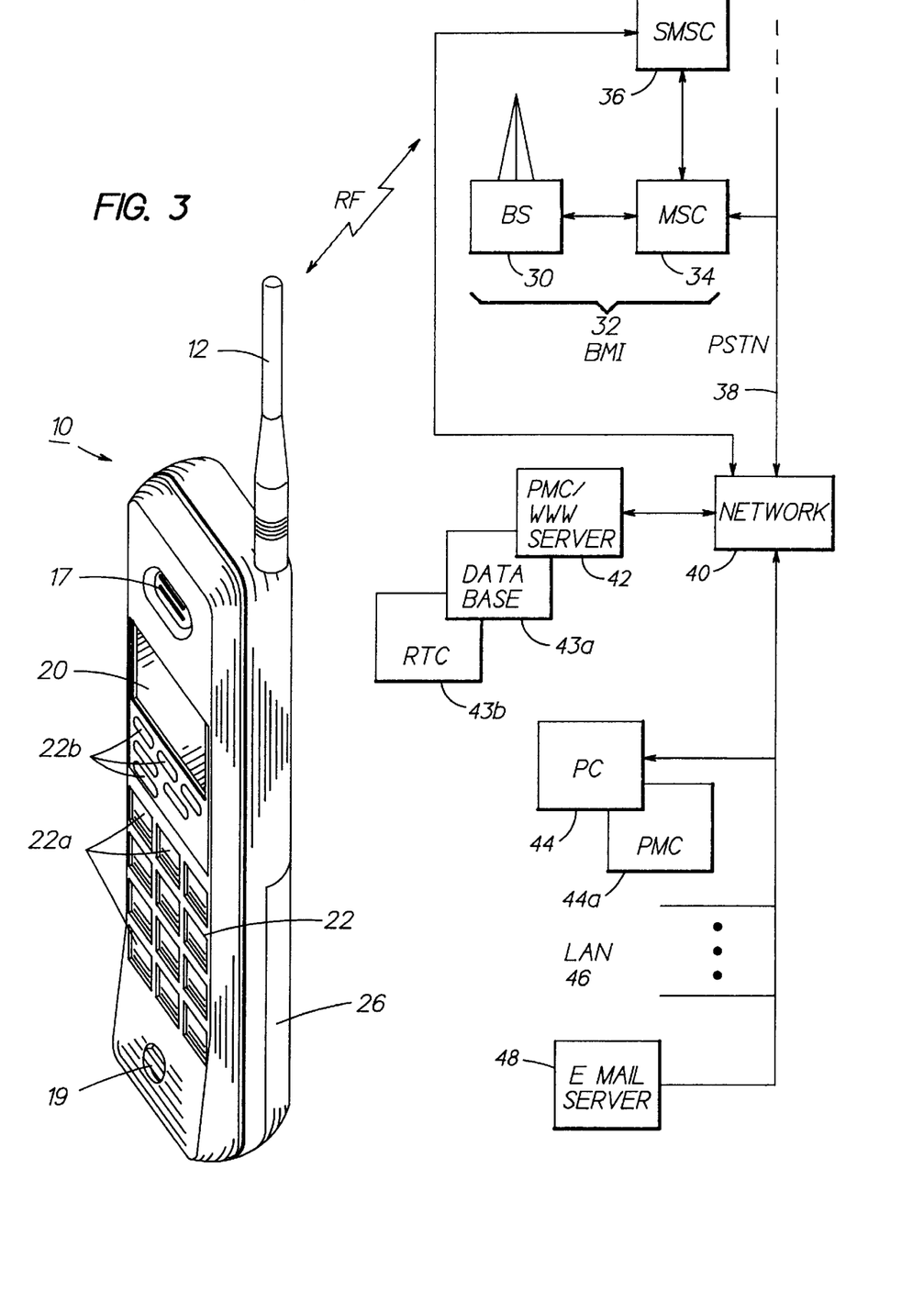
FIG. 3 illustrates a second embodiment of a cellular communication system to which the mobile station is bidirectionally coupled through wireless RF links.

Reference is made to FIGS. 1, 2 and 3 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising a Base Station/Mobile Switching Center/Interworking function (BMI) 32 that includes a mobile switching center (MSC) 34. The MSC 34 provides a connection to landline trunks, typically the Public Switched Telephone Network (PSTN) 38, when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a physical and logical frame structure suitable for the transmission of data and messages, including SMS or equivalent messaging facilities.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages and SMS messages, that are received from the BMI 32 prior to the display of the messages to the user.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of air interface standards including IS-136, GSM and IS-95. It should thus be clear that the teaching of this invention is not to be construed to be limited to any one particular type of mobile station or air interface standard.

The operating program in the memory 24 includes routines to present messages and message-related functions to the user on the display 20, typically as various menu items. The memory 24 also includes routines for implementing the methods described below.

Referring specifically to FIGS. 2 and 3, there is also provided a subscriber messaging function embodied, preferably, as a Short Message Service Center (SMSC) 36 that is coupled to the MSC 34. The SMSC 36 is responsible for managing the SMS functions of the cellular system. Connected to the PSTN 38 is a network block 40, which may be the internet, a private leased link, or any suitable wide-area or global communications network that is accessible from personal computers (PCs) 44. The network 40 may operate with a TCP/IP protocol. Suitable, but not limiting, lower level protocols include X.25 and X.400. Various Local Area Networks (LANs) 46 may also be connected to the network 40, providing access to the network 40 for LAN-connected PCs (not shown).

In accordance with an aspect of this invention the system further includes a network server, such as a World Wide Web (WWW) server 42, that is coupled to the network 40. In the illustrated embodiments of this invention the WWW server 42 implements a Personal Messaging Calendar (PMC) application. Although the ensuing description will be made primarily in the context of the PMC application, it should be realized that the PMC application is exemplary of the wide-number of possible applications that can be implemented at the server 42, in accordance with the teachings of this invention.

In the embodiment of FIG. 2 a direct connection is made from the WWW server 42 to the SMSC 36, while in the embodiment of FIG. 3 a port of the SMSC 36 is connected to the network 40. The distinctions between these two embodiments will be made more apparent below.

In order to take advantage of the full functionality offered by this invention, a user, typically a cellular subscriber, has access to the mobile station 10 and the PC 44 (having the connection to the network 40). A suitable software program is loaded onto the PC 44 for implementing, by example, the PC-end of the PMC application. The system operator has the WWW server 42 connected to the system operator's SMSC 36, as in FIG. 2, or connected to the network 40 as in FIG. 3. The WWW server 42 has software designed to support the subscriber's PMC software. The subscriber may also have PMC software, or firmware 24a, stored in the memory 24 of the mobile station 10. This software or firmware 24a is used to interact with SMS-based messaging applications, such as the PMC.

An example of a possible application of the invention is a reminder delivery system using the PMC application, wherein the subscriber instructs, from the mobile station 10 or the PC 42, to have a message delivered to his or her mobile station 10 at a predetermined time prior to a scheduled appointment. If the PC 44 is connected to the network 40, it may immediately update the WWW server 42 with the new calendar information, or it may wait until it is connected. The WWW server 42 replicates the reminder delivery information so that the information is delivered on time through the latency-free cellular network, using the SMSC 36, MSC 34, BS 30, and the radio link to the mobile station 10. The meeting reminder is delivered to the mobile station 10 using the SMS facility of the cellular network.

The subscriber may also use the mobile station 10 to send appointment or reminder information (e.g., a "To Do" list) to the PMC application running on the WWW server 42, using the mobile station's display 20, keypad 22, and the PMC firmware 24a stored in the memory 24. The subscriber may also later review, cancel and modify the stored information in a similar manner, or may perform this function from the PC 44.

The WWW server 42 can be polled on a regular basis, by the subscriber's PC 44, to keep a current copy of the set of calendar appointment entries.

In FIG. 2 the WWW server 42 uses a predetermined protocol to communicate messages and their associated information to the SMSC 36, in a direct private connection over a low-latency communication link 42a. It should be realized that the SMSC 36 and WWW server 42 can be co-located at one site in the network provider's infrastructure, or may be separated by a considerable distance.

In FIG. 3, the WWW server 42 uses a specialized or proprietary protocol, that may be built upon a TCP/IP internet transfer layer, to communicate with the SMSC 36 via the network 40.

In both cases the PMC/WWW server 42 includes a subscriber database 43a and a real-time clock (time and date) function 43b. The database 43a stores, by example, Appointment and "To Do" lists that were previously entered by the subscriber from one of the mobile station 10 or PC 44.

In the examples of FIGS. 2 and 3 the exemplary PC application is referred to as the Personal Messaging Calendar (PMC), or simply as the Messaging Calendar (MC), and the WWW server 42 may be referred to also as the Personal Message Center (PMC). It should be realized that these functions are "personal" in so far as an individual subscriber is concerned. Typically, however, the PMC application software running at the PMC/WWW server 42 will be interacting with hundreds or thousands of subscribers, each having access to at least one of a mobile station 10 and a PC 44.

The PMC application and database 43a running on the WWW server 42 functions as a master information holder for applications such as the Messaging Calendar. Since the PMC/WWW server 42 is accessible by the network 40 and the PSTN 38, it is configured with a suitable interface, such as the WWW-based subscriber interface that can be accessed with a conventional internet browser program. This implies that the subscriber can access his or her calendar entries and reminders from anywhere in the world through the network 40, a telephone network, or any other means of reaching the PSTN 38. The PMC application, having access to the SMSC 36 through the link 42a (FIG. 2) or the network 40 (FIG. 3), is additionally capable of recording all of the subscriber's transmitted and received SMS messages, and for also maintaining a record as to whether transmitted SMS messages have reached their destination. Subscriber groups and standard message storage are available from the WWW-based PMC, so that the subscriber may directly send messages.

The PC 44 portion of the PMC application 44a may run under any suitable PC operating system, including those that present applications in windows. In accordance with an aspect of this invention the subscriber is able to rely on appointments and reminders being sent to his or her mobile station 10 in a timely manner. The mobile station 10 does not need to be connected by cable to the PC 44. Instead, the reminders can sent automatically from the network-connected PC 42, through the network 40 and PMC/WWW server 42, to the SMSC 36. The SMSC 36 then formats a suitable SMS message, either in accordance with the SMS signalling protocol of the applicable air interface standard or a presently preferred DESC format (described below), and causes the SMS message to be transmitted to the mobile station 10 through the MSC 34 and BS 30. Appointment, message and timely reminder texts can thus be sent from the desktop PC 44 to the subscriber's mobile station display 20.

For those times when the subscriber does not have access to the mobile station 10, and wishes to view and possibly respond to new messages, access is made to the PMC/WWW server 42. This access can be made through the network 40 from the PC 44 or a LAN-connected PC. The subscriber has immediate access, from anywhere in the world, to the PMC application with the WWW browser-equipped PC 44, personal digital assistant (PDA) device, or any suitable data processor capable of accessing the network 40. By example, the subscriber simply accesses the PMC application running at the PMC/WWW server 42 as he or she would any internet site. After the correct identification is made, the subscriber has access to the subscriber's messages and other information maintained by the PMC application running at the PMC/WWW server 42.

By example, one or more new calendar appointments may be entered by the subscriber directly into a window on the PC 44, or previous appointments may be reviewed, deleted, or revised, and the appointment or appointments are transferred automatically from the subscriber's PC-based calendar application that is running on the PC 44 to the PMC/WWW Server 42. For example, this could be done in the morning before the subscriber leaves the home or the office to make, for example, sales calls. Prior to each scheduled appointment a reminder is sent to the subscriber's mobile phone display 20, via the SMSC 36, MSC 34 and BS 30. The appointment reminder is received by mobile station 10 as a SMS message (preferably a DESC-encoded SMS message as described below), and is stored in the memory 24 for review by the subscriber, using the normal SMS message capabilities of the mobile station 10.

The Personal Messaging Calendar application also enables immediate SMS messaging from the PC 44 to the mobile station 10. An acknowledgment of receipt of the SMS messages by the mobile station 10 is also supported. A call-back number and reply charge-acceptance may also be selected on a per message basis.

In a presently preferred embodiment of this invention a Messaging Window of the Personal Messaging Calendar application running at the PC 44 accepts the appointment entries and messages into a graphical representation of the mobile station's display 20. That is, the subscriber may be presented with a similar user interface whether accessing the PMC application from the PC 44 or the mobile station 10. Basic editing functions may be performed within the display area. This allows the subscriber to enter the text as the subscriber wishes the text to be later displayed at the receiving mobile station 10.

Also in a presently preferred embodiment, the calendar entries can be selected to repeat at convenient intervals, and the subscriber is made aware of any scheduling conflicts entered into the calendar. A Message Validity time-out is configurable for those messages that are time critical, or that will become outdated at a certain time. The message reply destination is also configurable, with the default destination being the subscriber's cellular phone number. A warning is displayed if a message is sent when the SMSC 36 is not functioning. A confirmation is displayed when some number of re-try attempts finally achieve successful delivery.

Further in accordance with this invention any SMS Messages sent to the subscriber's mobile station 10 from other mobile subscribers may be copied to the PMC/WWW server 42 by the SMSC 36. This allows the PMC subscriber to view received SMS messages while not having cellular network access, after accessing the PMC/WWW server 42 through the network 40. The subscriber may add, edit, delete or send any message while in the PMC application running on the PMC/WWW server 42. Messages that have successfully reached the mobile station 10 are flagged so that only unread messages may be conveniently selected. Messages already read are moved from an 'unread' or new message folder to an 'old' message folder.

The subscriber may also originate messages from the Personal Message Center application. The messages may be sent to individuals or to groups. In a presently preferred embodiment of this invention the PMC application supports a list of possible messages, stored in folders, that may be selected to facilitate message origination. The subscriber may also create and store a list of phone numbers by parsing stored call-back numbers. Group mailing lists may be formed from the list of phone numbers in the PMC, which can be automatically updated by the PMC.

One important function of the Personal Message Center application is the management of the timed release of outgoing reminders and messages. The subscriber may add, edit, or delete messages while connected to the PMC application. All messages are preferably encrypted in order to pass securely through the network 40, such as the internet, to the Personal Message Center application running on the PMC/WWW server 42, and from the PMC/WWW server 42 to the SMSC 36 via the network 40 (as in the embodiment of FIG. 3).

Having thus described the invention in the context of the PMC application, a description will now be given of a presently preferred message format that is designed for, but is not limited to, exchanging information using SMS messaging protocols.

By way of introduction, it is noted that it may not be sufficient to simply transmit the message as normal text.

Instead, the message needs to be encoded so that different parts of the message can be separated from each other and more readily interpreted. The message format described in detail below, referred to as the Data Exchange, Storage, and Command (DESC) format, fulfills this need.

It is also noted that although the various examples are shown below as occupying several lines of text, in practice a data set consists of one continuous stream of characters without line feeds.

Data set

The data set holds all the information which is needed by an application. This includes the data set's identification, additional information for the application, and the actual data items.

The data set can be thought of as one unit which can be stored in a memory, exchanged among different applications, or sent from or received by the mobile station 10 via the air interface. A data set can have the appearance of a string, a SMS message, or any other structure that can accommodate ASCII characters. As used herein, ASCII characters refer to the standard character set of the applicable air interface standard (e.g., GSM or IS-136).

In principle, a data set can be of arbitrary length. In practice, however, the actual length is constrained by the data set's appearance. It may happen that the length of the information exceeds the length of a data set. In this case the information must be broken down into two or more data sets. The DESC format provides a mechanism to handle these situations, as will be described below.

The first two characters of a data set are two forward slashes //. These two slashes indicate that the remainder of the information is DESC-format encoded. The end of a data set is not specified, as it varies depending on the data set's appearance. For example, the end of a data set implemented in the C programming language is indicated by a '\0' (zero terminated string). The generic DESC format of a data set is: // <remainder of the information>.

Entry (general)

The <remainder of the information> consists of fields or entries. An entry holds all relevant information for one data item. A data set is made up of at least one entry (=application entry), and more (=data entries) can follow if required. Entries are separated from one other with a comma (,) delimiter. A given entry has three parts: the entry identifier, the entry options, and the entry value. The identifier, options and value parts are separated from each other with a colon (:) delimiter. The order of the entry parts is fixed as: identifier, options, value.

Application Entry

The application entry contains important information for the application which must process the information that follows after the application entry. There is always one, and only one, application entry in the data set. It is always the first entry. The three parts of an application entry are referred to as the application identifier, the application option, and the application value. A given application entry must have one application identifier, can have none, one, or several application options, and can have one application value.

The generic DESC format of an application entry is as follows:

<appl identifier>[:<appl option>[: . . . ]][:<appl value>]

All application options and application values are predefined to insure that any application that uses the DESC format can interpret the application entry. Also, an exemplary list of application identifiers is provided below.

An application identifier is the first part of an application entry. It names the application to which the data set is being sent. However, other applications may be able to interpret the data set if the data set contains common data identifiers. The application options give additional information to the destination application about the remainder of the DESC encoded information. An application entry may include none, one or several application options. An application value describes the type of the encoded information. The application value is not mandatory, and can be eliminated. However, if used only predefined application values are legal.

Data entry

A data entry holds the actual data that the destination application is to work with. There can be none, one, or several data entries in a data set, and the data entries always follow after the application entry. The three parts of a data entry are referred to as the data identifier, the data option, and the data value. A given data entry must have one data identifier, can have no data option or can have several data options (if there is a data value), and can have one data value.

The generic DESC format of a data entry is as follows:

<data identifier>[[:<data option>[: . . . ]]:<data value>]

The data identifier is the first part of a data entry. It is a description for the value of the corresponding data entry. Data options are defined so as to give additional information about the data value. In practice, data options may be infrequently used, and are therefore application specific. Every application may define its own data options. A data entry may include none, one or several data options. The data value is the actual data which is referred to by the data identifier within the same data entry.

Basically, there is no restriction on what a data value may contain so long as it conforms to the specification given for a data set. A data value can consist of any sequence of letters, digits, blank spaces and punctuation marks. Commas (,) and colons (:) are handled differently.

Identifiers

An identifier consists of one letter or a sequence of letters and underscores. No blanks or white spaces are allowed. At least the first character of an identifier must be a letter. Identifiers are not case sensitive.

There is no limitation in length for identifiers, but for practical purposes they are kept as short as possible.

The generic DESC format of an identifier is as follows:

<letter>[[<letter>|<underscore>]. . .

Where:

<letter>=<a . . . z|<A..Z>

<underscore>=_

Options

An option is split into several parts: the option identifier, the option argument, and the option value. The option identifier, option argument and option value build one sequence of characters. No blanks or white spaces are allowed.

The generic DESC format of an option is as follows:

<opt identifier>[[[<opt value>]<opt argument>] . . . ] <opt value>]

The option value is defined as zero (0) or any positive integer.

Arguments

The following characters may be used for arguments:

= < > − / .

The following character combinations may also be used for arguments:

<= >= <>

Other characters or combinations are not allowed.

Special characters

Special attention is paid to two special characters: the comma (,) and the colon (:), as these characters are used as delimiters within the DESC format. If required as part of a data value, these characters are represented by repeating the character (for example, a comma is represented as ,,.

Multi-language support

Preliminary, predefined DESC identifiers and possible options are intended for applications, such as the PMC application described above, which use them for value references. For that reason, application and data identifiers are defined only in English.

Application identifier

A list of presently preferred application identifiers is as follows.

Application identifiers:

APP (Appointments)

TODO

ALERT

BC (Business Card)

HOURS

INFO

SALES

SPORT

STOCK

TIME (For combined time/date information)

WWW

Confirmation

This option requests the receiver of the message to confirm the reception of the encoded information. The form of the confirmation is a function of the application.

Identification

With this option, the data set can be given a unique identification.

ID<y> where y can be 0 or any positive integer

Parts

With this option, the present data set can be marked as the mth part out of n parts in total. The values of m and n can be any positive integer. It is the application's responsibility to split and concatenate the parts of the data set in a correct manner. This option is used when it is impossible to pack the information to be sent within one data set. The above-described ID option can be used in connection with the PART option.

PART<m>/<n>

The PART option is especially useful when a PMC message or reminder exceeds the maximum length allocated for a SMS message in the Cellular system illustrated in FIGS. 2 and 3.

Version

This option indicates the version number of the application (e.g., PMC Ver. 1.0 or PMC Ver. 1.1) which has created the present data set. The variable x can be 0 or any positive integer.

VERS<x>[.<x>]

Application value

The application value (value of the first entry of a data set) is reserved for application specific information. By not supplying any application value indicates the "standard information" of the application that is identified by the application identifier.

Error

The ERROR application value can be used by any application to indicate a fault in message processing.

Because of its intended universal application, the DESC specification does not define the contents of the data set for an error message. However, one of at least two generic formats can be followed.

1. If the erroneous data set is not clearly identified by an ID application option, then the full received message can be sent back to the sender with the addition of an ERROR application value and a corresponding data entry (data identifier =ERROR and data value =short error description). By example:

// <application identifier>: ERROR ,ERROR:<short error description>,<entries of received message>

2. If the received data set is identified by an ID application option, then the received application entry with the ERROR application value, a corresponding data entry (data identifier =ERROR and data value =short error description) and the erroneous data entry can be sent back to the sender of the erroneous message. By example:

// <application identifier>: ID<y>:ERROR ,ERROR:<short error description>, <erroneous data entry>

Command

A message with a COMMAND application value is constructed freely according to a conventional, generic format and an application's need. A command is usually sent to a specific application, such as the PMC application. However, several applications may use same command entry.

// <application identifier>:COMMAND ,<command identifier>[[:<command options>]:<command value>]

By using the above-described ID application option, a command can be applied specifically to a certain message or data set without specifying additional command options or command values. For example:

// <application identifier>:ID<y>:COMMAND ,<command identifier>[, ... ]

Reply

The REPLY application value can be used to identify the data set as an answer or a reply to a request or a command. The format is as follows:

// <application identifier>:REPLY ,<data entry>

Query

The QUERY application value can be used if an application is to retrieve certain information from another application. Search criterion are given by specifying one or more data entries. If there is more than one data entry, they are ANDed for the search.

// <application identifier>:QUERY ,<data entry>
Data identifier

To ensure that applications can read information generated by other applications, a number of commonly used data identifiers and values are predefined by DESC as follows.

| | |
|---|---|
| TITLE:<a title> | (a header or summary) |
| MSG:<a message> | (a test message) |
| DATA:ddmm[yy]yy | (also used as starting date) |
| TIME:hhmm[ss] | (also used as starting time) |
| EDATE:ddmm[yy]yy | (end date) |
| ETIME:hhmm[ss] | (end time) |
| ADATE:ddmm[yy]yy | (Alert/Alarm date) |
| ATIME:hhmm[ss] | (Alert/Alarm time) |
| NAME:<name> | |
| ADDRESS:<address> | |
| TEL:<tel number> | |
| EMAIL:<user@host> | |
| FAX:<fax number> | |
| ERROR:<error description> | |

A number of the foregoing Data Identifiers are used by the PMC application software, including MSG, DATE, TIME, ETIME, and ADATE.

The above described DESC format thus specifies a way to encode information. Encoded information can be sent as short messages (e.g., SMS messages) to or from the mobile station 10. Any information that is encoded in DESC format can be stored in a memory or processed as any other character string, since it consists only of ASCII characters.

This following description demonstrates the flexibility of the DESC format, and illustrates various exemplary applications of DESC encoded information.

When provided in the mobile station 10, or other wireless communication device, a DESC Message Parsing option is selected from a displayed feature list. When selected, the mobile station 10 is able to recognize, then parse, DESC messages and display the result on the display 20.

To be able to parse and to present DESC encoded information, the mobile station's software must have a priori knowledge of the structure of the DESC message format. The mobile station 10 is not required to process the received data.

If an application or data identifier is not known to the mobile stations's software (for example, is not stored in a list of supported applications), then the application identifier or data identifier and the associated data value is shown "as is". However, if an application or data identifier is known to the software, it being assumed that the software maintains a pre-programmed list, which can be extended by sending another DESC message, then the application identifier or data identifier and its associated data value are translated and displayed in a more convenient, application specific format.

The procedure that is applied to displaying the DESC message need not differ from the procedure used for conventional SMS message handling. The application specific information that is displayed includes the application identifier and application value. The data specific information that is displayed consists of the data identifier and data value.

By example, the following DESC received message:

// APP;ID982 ,ERROR:<description>,TITLE:LUNCH ,MSG:With Jim ,DATE:251098 ,TIME:1230 ,EDATE:251098 ,ETIME:1345 may be displayed in a first display format as follows, when parsing is performed by the mobile station 10 (assuming that all identifiers are unknown, and DESC Message Parsing is selected from a displayed feature list):

NEW: Oct. 25, 1998 11:20:03 APP: of type ERROR<description> TITLE: Lunch MSG: With Jim DATE: 251098 TIME: 1230 EDATE: 251098 ETIME: 1345 Sender: +2125551212

However, the same DESC message may be shown as follows when parsed and suitably translated, where translation presupposes that both DESC Message Parsing and a PMC-related Calendar Translator Application are selected from the displayed feature list:

NEW: Oct. 25, 1998 11:20:03 A.M. APPOINTMENT: of type ERROR<description>TITLE: Lunch MESSAGE: With Jim DATE: Oct. 25, 1998 TIME: 12:30 P.M. END TIME: 1:45 P.M. Sender: +2125551212

Note that the above example of the Calendar Translator application has translated the abbreviated application and data identifiers into full words (English in this case, although any language (user selected) may be supported). Also, dates and times have been formatted in a local manner. Also, the end date information is optionally deleted, as the end date is equal to the start date. As such, the message is displayed in a second display format that differs significantly from the first display format.

Each application that may be parsed with the DESC Message Parsing feature have their own associated translation and executable features that may be selected from the user interface feature list.

Further in accordance with this invention the translator and execution features may be loaded into the mobile station 10, using the DESC format via SMS.

Figure 4:
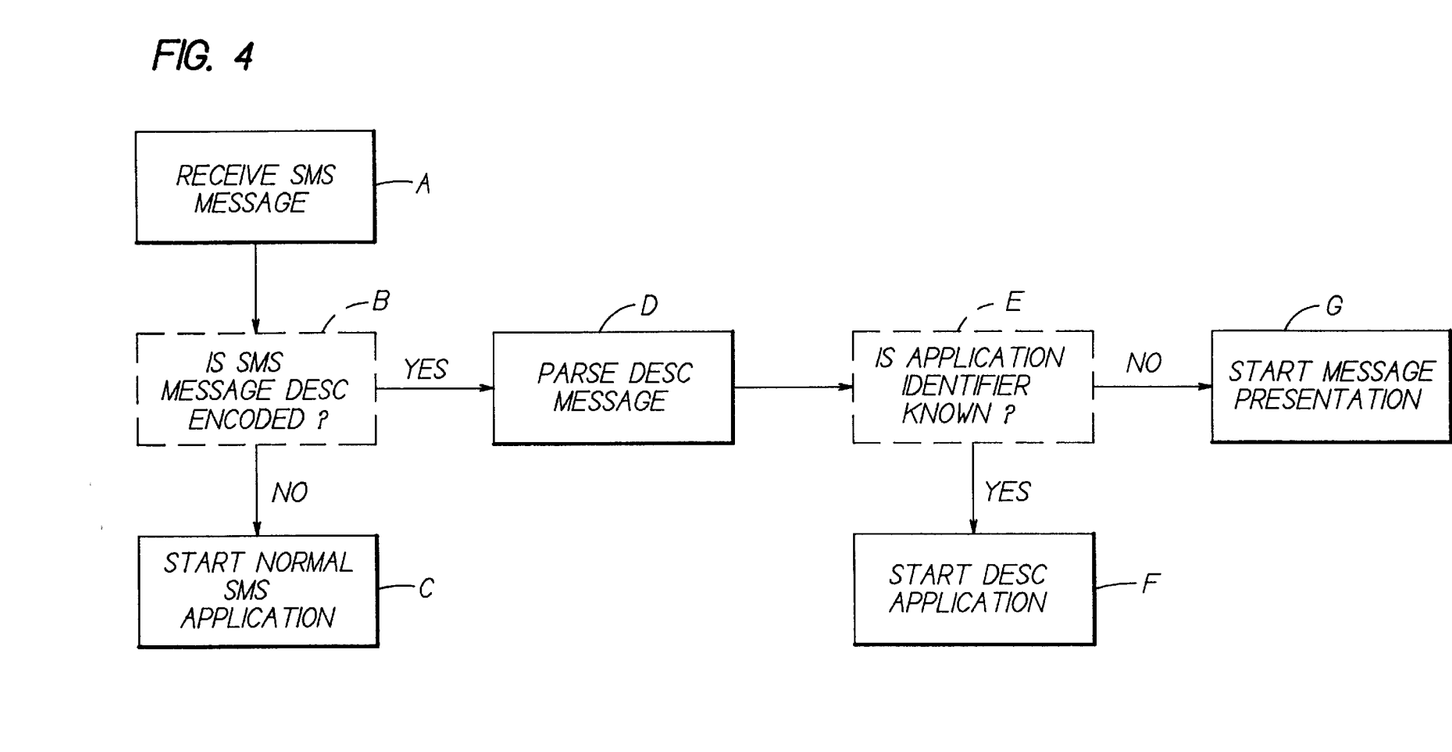
FIG. 4 is a logic flow diagram that illustrates a response of the mobile station to the receipt of a SMS message.

Referring now to FIG. 4 which illustrates a method in accordance with this invention, at Block A the mobile station 10 receives a SMS message. At Block B the mobile station 10 determines if the SMS message is in a first transfer format or a second transfer format. That is, it is determined if the SMS message is in a non-DESC format or the DESC format (as described above). If not in the DESC format, control passes to Block C to perform conventional SMS processing. If the received SMS message is in the DESC format control instead passes to Block D where the controller 18, operating under the control of DESC-related firmware or software, parses the DESC encoded SMS message. At Block E a determination is made if the Application Identifier is a known (to the mobile station) application identifier. As was described above, the application identifier is the first part of an application entry, and it names the application to which the data set is being sent. If the Application Identifier is known, control passes to Block F where the associated application (e.g., APP or appointments) is initiated (see the example presented above relating to the Lunch message). If the Application Identifier is not known (to the mobile station 10), control passes instead to Block G where the associated text message is presented without the application-specific formatting.

A subscriber having the mobile station 10 is enabled to access a desired application using a displayed menu. After selecting the desired application the subscriber may manipulate soft keys and the keypad 22 so as to enter information in response to prompts (assuming that the mobile station does not include a touch screen or some other suitable user interface). By example, to enter an appointment into the PMC application, the following display may be presented.

| | |
|---|---|
| TITLE | A title for the appointment. |
| TEXT | A description for the appointment (e.g., |

| | |
|---|---|
| | Lunch with Jim, the location of the restaurant, etc.). |
| START INFO. | The subscriber enters the starting date and time for the appointment. |
| END INFO. | The subscriber enters the ending date and time for the appointment. |
| ALERT INFO. | The subscriber enters an alert date and time for the appointment (e.g., one hour prior to the Start time). |

After the last information screen is filled in (i.e., Alert Info.), a SAVE soft key can be depressed. Depressing the SAVE soft key initiates sending the entered information to the PMC/WWW server 42. The appointment information is sent to the PMC/WWW server 42 using a DESC-encoded SMS message, via the RF link, BS 30, MSC 34, SMSC 36, and one of the link 42a or the network 40. At a time corresponding to the Alert time, the PMC/WWW server 42 initiates the sending of a DESC-encoded SMS message to the mobile station 10, via a path that is the reverse of that used to send the appointment information to the PMC/WWW server 42.

It is also within the scope of this invention to send a message receipt confirmation message back to the mobile station 10 from the PMC/WWW server 42. In response to the receipt of the confirmation message, the mobile station 10 displays a suitable message (e.g., 'Appointment Saved') along with the Appointment Title. In this case the subscriber is assured that the appointment has been saved in the master appointment database 43a maintained by the PMC/WWW server 42.

At some subsequent time, identified by the Alert information, a SMS message is sent to the mobile station 10. One suitable displayed message format is to display the text "Reminder", along with the text "At" followed by the Time of the appointment, if the time was saved with the appointment.

The subscriber may also interact with the display 20 and keypad 22 to view existing appointments for a particular date. In this case the mobile station 10 sends a SMS message to the PMC/WWW server 42, after prompting the subscriber to enter the date of interest. After receiving the saved appointment information from the PMC/WWW server 42 and saving the information in the memory 24, a message "Appointments Received" can be displayed. Thereafter the subscriber can scroll through the appointments that were previously saved for the date of interest, which may be displayed by Title.

Similar or identical functionality is available from the PC 44, thereby providing the subscriber with multiple ways to access the information, while providing a unified and self-consistent user interface.

Although described in the context of entering Appointment events, the subscriber is also enabled to instead enter a "To Do" reminder or event. By example, to enter a "To Do" into the PMC application, the following display may be presented.

| | |
|---|---|
| TITLE | A title for the "To Do" entry. |
| TEXT | A description of the "To Do" (e.g., 'final sales report'). |
| PRIORITY | A subscriber-assigned priority for this "To Do" entry (1, 2, 3). |
| DEADLINE | A deadline date for the "To Do" entry. |

As with the Appointment entry described above, after the last information screen is filled in (i.e., Deadline), a SAVE soft key can be depressed. Depressing the SAVE soft key initiates sending the entered information to the PMC/WWW server 42. The "To Do" information is sent to the PMC/WWW server 42 using a DESC-encoded SMS message, via the RF link, BS 30, MSC 34, SMSC 36, and one of the link 42a or the network 40.

The subscriber may also interact with the display 20 and keypad 22 to view, delete, and edit existing "To Do" entries. In this case the subscriber may select to view all "To Do" entries in the list, or to view only those "To Do" entries having a specified priority class or level. In this latter case the mobile station 10 sends a SMS message to the PMC/WWW server 42, after prompting the subscriber to enter the desired priority class. After receiving the previously saved "To Do" information from the PMC/WWW server 42 and storing the information in the memory 24, a message "To Do List Received" can be displayed. Thereafter the subscriber can scroll through the "To Do" entries that were previously saved for the desired priority class.

The subscriber can also interact with the display 20 and keypad 22 to delete and revise previously saved Appointment and "To Do" entries. Also, and as was described above, the subscriber can also gain access to the subscriber's database 43a entries in the PMC/WWW server 42 via the PMC software installed in the PC 44. In this manner various Appointment and "To Do" entries can be entered, saved, reviewed and modified from the PC 44. In both cases (e.g., mobile station access or PC access), the presently preferred DESC format is used (with any suitable modifications that may be required in order to pass through the network 40). Also in both cases, the subscriber is enabled to store information relating to some event, typically a future event, in the database 43a that is coupled to the messaging function or SMSC 36.

Although described in the context of the PMC application, it should be realized that this particular application is exemplary, and should not be read as a limitation on the practice of this invention. That is , other valuable applications can also be implemented in accordance with the teachings of this invention. By example, other potential applications of this invention include, but are not limited, using SMS-based messaging between groups of mobile stations and PCs for queued and scheduled email; for meeting, appointment and absence management; for project hours reporting; for sales and inventory updating; for personalized information services; and for home security applications.

Further by example, a subscriber can be notified of the receipt of email by storing the notification and/or the email header information into the database 43a. This can be done from a data processor that functions as an email server 48. In this example the Alert time could be set to zero. That is, subscriber-related information and events can be stored in the database 43a by other than the subscriber or the SMSC 36, in this case by the email server 48.

In a presently preferred embodiment of this invention, and referring again to FIG. 1, a non-volatile portion 24b of the memory 24 is allocated for local storage (LS). The local storage 24b may be allocated either statically or dynamically. The local storage 24b can be used to store the user's events to be viewed immediately or when out of a cellular coverage area. The local storage 24b can also be used to temporarily store added or modified user events when out of the cellular coverage area. After the mobile station 10 is once more in a cellular coverage area the stored events can be transmitted to the PMC/WWW Server 42 using the protocols described above. The user can also employ the local storage 24b to temporarily store events should the user decide to postpone a reply action for a received alert. The local storage 24b also provides a mechanism to generate locally triggered alerts. For example, the user stores an alert in the local storage 24b, which is then checked by local PMC application software 24a using an internal real-time clock (RTC) 21. An alert is then triggered locally when the current time matches the time stored with the alert in the local storage 24b. Both user-generated information and information received from the BMI 32 can be stored in the local storage 24b.

It is also within the scope of this invention to provide the user interface of the PC/PMC 44a with a special screen saver or similar software. This screen saver may function as any conventional password-protected screen saver, but in addition displays a floating or moving window. Using the window anyone visiting the user's PC site (such as an associate in the user's office) can enter a SMS message. After completing the message a predetermined keystroke or mouse click causes the entered SMS message to be transferred automatically to the user's mobile station 10 via the PMC/WWW Server 42 and SMSC 36.

Thus, although the invention has been described in the context of preferred embodiments, it should be realized that a number of modifications to these teachings may occur to one skilled in the art. Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless mobile station of a type that is capable of bidirectional communication with a Base Station, Mobile Switching Center, Interworking Function (BMI) having a user messaging function, comprising the steps of:

providing a user application that comprises a database, the user application and database being bidirectionally coupled to the user messaging function;

at the mobile station, entering information that is descriptive of an event that is to occur at some future time;

sending the entered information from the mobile station to the user application using a message sent through the BMI and the user messaging function; and storing the information in the database under the control of the user application for subsequent recall from the database and notification at a time that is a function of the specified future time, the notification occurring by using a message transferred from the user application to the user's mobile station using another message sent through the BMI and the user messaging function.

2. A method for operating a wireless communications network of a type having a Base Station, Mobile Switching Center, Interworking Function (BMI), a user messaging function, and at least one mobile station that is bidirectionally coupled to the BMI through a wireless link, comprising the steps of:

providing a user application that comprises a database, the user application and database being bidirectionally coupled to the user messaging function and also to a data communications network;

using a data processor to enter information that is descriptive of an event that is to occur at some future time;

sending the entered information to the user application using a message sent through the data communications network;

storing the information in the database under the control of the user application; and at a time specified by the stored information, sending a message to a mobile station using the messaging function and the BMI.

3. A method for operating a wireless communications network of a type having a Base Station, Mobile Switching Center, Interworking Function (BMI), a Short Message Service (SMS) function, and at least one mobile station that is bidirectionally coupled to the BMI through a wireless link, comprising the steps of:

providing a database and database controller that is bidirectionally coupled to the SMS function;

using the mobile station to enter information that is descriptive of an event;

sending the entered information from the mobile station to the database, via a first SMS message sent through the BMI and SMS function;

storing the information in the database;

adding to, revising, or deleting the stored information in the database from one of a data processor, that is coupled to the database controller through a data communications network connection, or from the mobile station; and at a time specified by the stored information, sending a second SMS message from the database controller to the same subscriber's mobile station that sent the entered information, via the SMS message function and the BMI, for alerting a user of the mobile station to the event.

4. A method as set forth in claim 3, wherein the first and second SMS messages are encoded in a Data Exchange, Storage, and Command (DESC) format.

5. A method as set forth in claim 3, wherein the step of storing includes a step of sending a confirmation SMS message from the database controller to the mobile station, via the SMS function and the BMI, for informing the user that the information was at least one of stored, modified, or deleted in the database.

6. A wireless communications network of a type having a Base Station, Mobile Switching Center, Interworking Function (BMI), a Short Message Service (SMS) center, and at least one mobile station that is bidirectionally coupled to the BMI through a radio link, and further comprising:

a database and database controller that is bidirectionally coupled to said SMS center and that is also bidirectionally coupled to at least one data processor through a data communications network;

a user interface in said mobile station for enabling a user to enter information that is descriptive of an event; and a transmitter in said mobile station for sending the entered information to said database controller, via a first SMS message sent through said BMI and said SMS center, for storage in said database; wherein said data base controller comprises a data base user interface that is responsive to input from either said mobile station, via said SMS center, or from said data processor, via said data communications network, for adding to, revising, or deleting the stored information in the database; and wherein said database controller is responsive to a time specified by the stored information, for sending a second SMS message to the user's mobile station, via said SMS center and said BMI, for alerting the user of said mobile station to an occurrence of a time related to the event.

7. A network as set forth in claim 6, wherein said first and second SMS messages are encoded in a Data change, Storage, and Command (DESC) format.

8. A network as set forth in claim 6, wherein said data communications network is comprised of the internet and is coupled to said data base controller through an internet interface between said database controller and the internet; and wherein said data processor is coupled to the internet and comprises software for adding to, revising, or deleting the stored information in said database.

9. A network as set forth in claim 8, wherein said data processor communicates with said database controller through the internet using messages that are encoded in a Data Exchange, Storage, and Command (DESC) format.

10. A network as set forth in claim 6, wherein said database controller is responsive to the storage of received information in said database for sending a confirmation SMS message to said mobile station, via said SMS center and said BMI, for informing the user that the information was at least one of stored, modified, or deleted in said database.

11. A network as set forth in claim 6, wherein said database controller is coupled to said SMS center through a data link.

12. A network as set forth in claim 6, wherein said database controller is coupled to said SMS center through the internet.

13. A wireless communications system of a type having a Base Station, Mobile Switching Center, Interworking Function (BMI), a Short Message Service (SMS) center, and at least one mobile station that is bidirectionally coupled to the BMI through a radio link, and further comprising:

a database and database controller that is bidirectionally coupled to said SMS center;

a first user interface in said mobile station for enabling a user to enter information that is descriptive of an event;

a transceiver in said mobile station for sending the entered information to said database controller, via a first SMS message sent through said BMI and said SMS center, for storage in said database; and a second user interface in a data processor that is bidirectionally coupled to said database through a network for sending a network message containing entered information to said database controller, via said network, for storage in said database; wherein a user is enabled to recall, revise, delete and add information in said database from either one of said first or second user interfaces; and wherein said database controller is responsive to a time, specified by at least one stored information entry, for sending a second SMS message to the user's mobile station, via said SMS center, said BMI, and said transceiver, for alerting the user of said mobile station to an occurrence of a time that is related to the event.

14. A system as set forth in claim 13, wherein said SMS center copies SMS messages directed to said mobile station into said database, and wherein a user is enabled to review received SMS messages and originate new SMS messages, to one or more recipients, from either one of said first or second user interfaces.

15. A system as set forth in claim 13, and further comprising an email server coupled to said database for storing in said database an indication of a receipt of an email message that is addressed to said mobile station, and wherein a user is enabled to determine, from either one of said first or second user interfaces, that an email message has been received.

16. A system as set forth in claim 13, wherein said first and second SMS messages and said network message are encoded in a Data Exchange, Storage, and Command (DESC) format.

17. A system as set forth in claim 16, wherein, for information that exceeds a predetermined length, the information is divided into a plurality of information portions that are sent in separate DESC-encoded SMS messages.

18. A system as set forth in claim 16, wherein a DESC-encoded SMS message received by said mobile station includes an Application identifier, and wherein said mobile station is responsive to said Application identifier for displaying received information in a format specified by the identified Application.

19. A system as set forth in claim 13, wherein said first and second user interfaces provide a unified and self-consistent user interface to a user.

20. A system as set forth in claim 13, wherein said network uses a TCP/IP protocol.

21. A system as set forth in claim 13, wherein said mobile station includes a read/write memory portion, and wherein said first user interface in said mobile station stores information in said read/write memory portion.

22. A system as set forth in claim 21, wherein said mobile station generates an alert when a time specified by the stored information equals a current time.

23. A system as set forth in claim 13, wherein said second user interface includes a screen saver function that comprises a window within which a message can be composed for transmission to said mobile station as a SMS message.

24. A method for operating a wireless communications network of a type having a wireless communication network, a wireless communication network user messaging function, and a plurality of mobile stations bidirectionally coupled to the network through radio channels, individual ones of said plurality of mobile stations being associated with individual ones of users of said wireless communication network, comprising the steps of:

providing a personal messaging calendar (PMC) application that comprises a database for storing information for individual ones of at least some of said plurality of users of the wireless communication network, the PMC application and database being bidirectionally coupled to the wireless communication network user messaging function through at least one of a local data communications network or a global data communications network;

operating a first user interface of a data processor to enter information relating to a particular individual one of said users;

sending the entered information to the PMC application using a first message sent through the global data communications network;

storing the information in the database under the control of the PMC application; and subsequently recalling the stored information from the database and sending a second message to an individual one of said plurality of mobile stations through the radio channel and the wireless communication network using the wireless communication network user messaging function, the second message being presented to the user with a second user interface of the same or a different mobile station.

25. A method as in claim 24, wherein the global data communication network employs TCP/IP for sending messages.

26. A method set in claim 24, wherein the wireless communication network user messaging function copies wireless communication network messages directed to the mobile station into the database, and wherein a user is enabled to review received wireless communication network messages and originate new wireless communication network messages, to one or more recipients, from either one of said first or second user interfaces.

27. A method as in claim 24, and further comprising an email server coupled to the database for storing in the database an indication of a receipt of an email message that is addressed to a particular one of the plurality of mobile stations, and wherein an associated user is enabled to determine, from either one of the first or the second user interfaces, that an email message has been received.

28. A method as in claim 24, wherein, for information that exceeds a predetermined length, the method further includes a step of partitioning the information into a plurality of information portions that are sent in separate formatted wireless communications network messages.

29. A method as in claim 24, wherein the first and the second messages are sent in a Data Exchange, Storage, and Command (DESC) format, wherein a DESC formatted wireless communication network message received by the mobile station includes an Application identifier, and further comprising a step of, responsive to the Application identifier, displaying received information in a format associated with the identified Application.

30. A method as in claim 24, wherein the first and second user interfaces provide a unified and self-consistent user interface to a user.

31. A method as in claim 24, wherein first user interface provides a data entry function that comprises a window within which text information can be entered for transmission to the mobile station.

* * * * *